US008843249B2

(12) United States Patent
Potagnik et al.

(10) Patent No.: US 8,843,249 B2
(45) Date of Patent: Sep. 23, 2014

(54) METHOD AND DEVICE FOR THE PASSIVATION OF GUIDANCE ORDERS OF AN AIRCRAFT

(75) Inventors: Nicolas Potagnik, Toulouse (FR); Mathieu Faurie, Toulouse (FR); Florent Lanterna, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 333 days.

(21) Appl. No.: 13/311,629

(22) Filed: Dec. 6, 2011

(65) Prior Publication Data

US 2012/0150366 A1 Jun. 14, 2012

(30) Foreign Application Priority Data

Dec. 9, 2010 (FR) ...................................... 10 60312

(51) Int. Cl.
*B64C 19/00* (2006.01)
(52) U.S. Cl.
USPC .................... 701/3; 701/14; 714/10; 340/979
(58) Field of Classification Search
USPC ............ 701/3, 14; 340/435, 903, 979; 714/10
See application file for complete search history.

(56) References Cited

U.S. PATENT DOCUMENTS

| 6,550,018 | B1 | 4/2003 | Abonamah et al. |
| 8,027,783 | B2 * | 9/2011 | Closse et al. ................. 701/120 |
| 8,649,920 | B2 * | 2/2014 | Potagnik et al. ................. 701/14 |
| 2007/0299568 | A1 | 12/2007 | Rouquette et al. |
| 2013/0184899 | A1 * | 7/2013 | Raynaud et al. .................. 701/3 |

FOREIGN PATENT DOCUMENTS

| CN | 102542847 A | * | 7/2012 |
| EP | 0315227 | | 5/1989 |
| FR | 2968784 A1 | * | 6/2012 |

OTHER PUBLICATIONS

Comparison of electrical drive technologies for aircraft flight control surface actuation; Atallah, K. et al., Electrical Machines and Drives, 1999. Ninth Inter Conf. (Conf. Publ. No. 468), Digital Object Identifier: 10.1049/cp:19991010; Publication Year: 1999, pp. 159-163.*
Kestrel—A Fixed Wing Virtual Aircraft Product of the Create Program; Morton, S.A. et al., DoD High Performance Computing Modernization Program Users Group Conference (HPCMP-UGC), 2009; Digital Object Identifier: 10.1109/HPCMP-UGC.2009.26 Publication Year: 2009, pp. 148-152.*
A formal method approach to analyze the design of aircraft Flight Control Systems; Nanda, M.; Rao, S.; Systems Conference, 2009 3rd Annual IEEE; Digital Object Identifier: 10.1109/Systems.2009. 4815773; Publication Year: 2009, pp. 64-69.*

(Continued)

Primary Examiner — Cuong H Nguyen
(74) Attorney, Agent, or Firm — Wood, Herron & Evans, LLP

(57) ABSTRACT

A device for verifying guidance orders includes a passivation device for implementing comparisons between guidance orders from at least three different equipments in order to generate a passivated guidance order. For example, one of the guidance orders may be an auxiliary guidance order used to compare to the other two primary guidance orders so that the primary guidance order that is closest to the auxiliary guidance order is selected as the passivated guidance order. The passivated (e.g., validated) guidance order is transmitted to a flight control system of the aircraft.

12 Claims, 3 Drawing Sheets

(56) References Cited

OTHER PUBLICATIONS

Autonomous reconfigurable flight control system design using control allocation; Hui-dong Wang ; Jian-qiang Yi ; Guo-liang Fan Systems and Control in Aerospace and Astronautics, 2008. ISSCAA 2008. 2nd International Symposium on Digital Object Identifier: 10.1109/ISSCAA.2008.4776188; Publication Year: 2008 , pp. 1-6.*

Lyapunov Guidance Vector Fields for Unmanned Aircraft Applications; Frew, E.W. et al.; American Control Conference, 2007. ACC '07; DOI: 10.1109/ACC.2007.4282974; Publication Year: 2007 , pp. 371-376.*

Advances in multi-mission autonomous rendezvous and docking and relative navigation capabilities; Miller, K. ; Masciarelli, J. ; Rohrschneider, R.; Aerospace Conference, 2012 IEEE; DOI: 10.1109/AERO.2012.6187303; Publication Year: 2012 , pp. 1-9.*

Vision-based tracking and estimation of ground moving target using unmanned aerial vehicle; Mingfeng Zhang ; Liu, H.H.T.;American Control Conference (ACC), 2010; DOI: 10.1109/ACC.2010.5531336; Publication Year: 2010 , pp. 6968-6973.*

Christopher P. Fuhrman, Chapter 2 Problem domain and Related Research, "Modular Redundancy in Fault-Tolerant Multiprocessor Systems," 1996, Ecole Polytechnique Federale de Lausanne, Lausanne, XP002657812, pp. 13-15.

French Patent Office, French Search Report FR 10 60312, Aug. 30, 2011 (2 pgs).

* cited by examiner

METHOD AND DEVICE FOR THE PASSIVATION OF GUIDANCE ORDERS OF AN AIRCRAFT

TECHNICAL FIELD

The present invention relates to a method and a device for the passivation of guidance orders of an aircraft, in particular of a transport airplane, being provided with a guidance system comprising at least one calculation stage for guidance orders. These guidance orders are adapted for a flight control system of the aircraft.

BACKGROUND

Within the context of the present invention, the term passivation is defined as searching for an erroneous order (or value) amongst a plurality of orders, isolating if applicable an erroneous order, and only transmitting a valid order to user systems.

Although not exclusively, the present invention more particularly applies to air operations requiring a navigation and guidance performance guarantee, and including to Required Navigation Performance with Authorization Required ("RNP AR"), of the RNP AR type. These RNP AR operations are based on a surface navigation of the aRea NAVigation ("RNAV") type and on required navigation performance operations of the Required Navigation Performance ("RNP") type. They have the particular feature of requiring a special authorization for being implemented on an aircraft.

Surface navigation of the RNAV type allows an aircraft to fly from a waypoint to another waypoint and not from ground stations (radio-navigation means of the NAVAID type) to other ground stations.

As known, the RNP concept corresponds to a surface navigation, for which (on board the aircraft) monitoring and warning means are added, allowing to ensure that the aircraft remains in a corridor, referred to as RNP, around a reference trajectory and authorizing taking into consideration curved trajectories. Outside this corridor, potentially relief or other aircrafts could be present. The performance required for a RNP operation type is defined by a RNP value representing half the width (in nautical miles: NM) of the corridor around the reference trajectory, in which the aircraft should remain 95% of the time during the operation. A second corridor (around the reference trajectory) of half a width twice the RNP value is also defined. The probability that the aircraft goes out of this second corridor should be lower than $10^{-7}$ per hour of flight.

The concept of RNP AR operations is still even more stringent. The RNP AR procedures are indeed characterized by:
  RNP values:
    being lower than or equal to 0.3 NM in approach, and that could go down to 0.1 NM; and
    being strictly lower than 1 NM at start and upon a throttling up, and that could also go down to 0.1 NM;
  a final approach segment that could be curved; and
  obstacles (mountains, traffic, . . . ) that could be located at twice the RNP value with respect to the reference trajectory, while for usual RNP operations, an additional margin with respect to obstacles is provided.

The air authorities have defined a target level of safety TLS of $10^{-7}$ per operation, whatever the type. In the case of RNP AR operations, as the RNP values can go down to 0.1 NM and the obstacles could be located at twice the RNP value of the reference trajectory, this objective results in a probability that the aircraft goes out of the half-width corridor D=2*RNP that should not exceed $10^{-7}$ per procedure.

The equipment embedded on board aircrafts (flight management system, inertial unit, means for updating GPS data and means for guiding the autopilot), as well as the usual architecture, do not allow the target level of safety to be reached, if operational mitigation means are not provided, including for detecting and managing possible breakdowns. This is why a special authorization is required for this type of operation, so as to ensure that the operational procedures and the pilots' training allow the target level of safety to be reached. Moreover, as the crew should take charge in some breakdowns, the aircrafts are today not able to guarantee a RNP value of 0.1 NM in a breakdown situation, as the crew are not able to meet the performance requirements in manual piloting.

As set forth previously, the current aircrafts are not able to guarantee a RNP value of 0.1 NM in a breakdown situation and the crew should be trained specially for flying the RNP AR procedures. The crew should, indeed, be able to detect and process adequately breakdowns being able to compromise the ongoing operation.

The objective for future aircrafts is to be able to fly RNP AR procedures with RNP values up to 0.1 NM, and this without restriction (in a normal situation and in the case of a breakdown) in start, approach and throttling up phases. To this end, the crew should no longer be considered as the main means for detecting and processing breakdowns.

As set forth above, an aircraft is generally provided with a guidance system comprising at least one calculation stage for guidance orders, being intended to a flight control system of the aircraft. Now, for the aircraft to have the ability to fly particular procedures and including RNP AR procedures, it is necessary to be able to remove from the guidance loop an erroneous source of calculation of guidance orders, so as to counteract its possible effects on the trajectory of the aircraft. Moreover, the solution being implemented should be reactive enough so as to counteract the effect of an erroneous order on the guidance of the aircraft in a transparent and immediate way.

SUMMARY OF THE INVENTION

The present invention aims at providing such a solution. It relates to a method for the automatic passivation of guidance orders in an aircraft, in particular a transport airplane, being provided with at least one calculation stage for guidance orders, being intended to a flight control system of the aircraft.

To this end, according to this invention, said method is remarkable in that:
  on said calculation stage for guidance orders an architecture is provided comprising at least N pieces of equipment, each of which is able to generate guidance orders, N being an integer higher than or equal to 3; and
  automatically and repeatedly:
    comparisons are made between, on the one hand guidance orders being considered as main ones and being generated by at least two of said pieces of equipment, and on the other hand a guidance order being generated by at least one third piece of equipment, being considered as auxiliary and being only used for comparisons; and
    as a function of results of these comparisons, one of said main guidance orders is selected, being transmitted to said flight control system of the aircraft, as a passivated guidance order.

Thus, thanks to the invention, comparisons are made between the guidance orders issued from at least three different pieces of equipment, so as to generate a passivated guidance order, that is valid (or not erroneous) and is transmitted to the flight control system of the aircraft. Thereby, a source (or a piece of equipment for generating a guidance order) is able to be removed from the guidance loop, when the source is defective (and transmits an erroneous or inaccurate order) so as to counteract its possible effects on the trajectory of the aircraft. Moreover, as further detailed herein under, the solution being implemented is reactive enough so as to counteract the effect of an erroneous order on the guidance of the aircraft in a transparent and immediate way.

The present invention thus allows the impact to be omitted of any simple breakdown of a calculation stage for guidance orders on the trajectory of the aircraft.

Moreover, according to the invention as a passivated guidance order, only one of said two main guidance orders is selected, and not said auxiliary guidance order. Thus, for generating this auxiliary guidance order, a piece of equipment could be provided, having a lower accuracy than the equipment generating the main guidance orders, which simplifies the implementation of the invention and reduces its cost.

In a first embodiment, preferably using a voter, as detailed below, automatically and repeatedly:
  each one of said main guidance orders is compared with the auxiliary guidance order; and
  as a passivated guidance order, the main guidance order is selected being the closest to the auxiliary guidance order.

In addition, in a second embodiment, preferably using at least one passivation element, as detailed below:
  a privileged guidance order is selected amongst said main guidance orders; and
  automatically and repeatedly:
    each one of said main guidance orders is compared with the auxiliary guidance order; and
    as a passivated guidance order, the privileged guidance order is selected as long as it remains the closest to the auxiliary guidance order, within about one tolerance value, and otherwise, a passivation value depending on the other main, not privileged, guidance order.

Moreover, in this second embodiment:
  said passivation value is equal, either directly to said other main, not privileged, guidance order, or to a threshold value being relative to the latter; and/or
  preferably, the passivated guidance order is filtered, so as to obtain a continuous value, being transmitted to said flight control system of the aircraft.

The present invention also relates to a device for the (automatic) passivation of guidance orders in an aircraft, in particular a transport airplane, being provided with a guidance system comprising at least one calculation stage for guidance orders, being intended to a flight control system of the aircraft.

According to the invention, said device of the type comprising at least one calculation stage for guidance orders, is remarkable in that:
  said calculation stage for guidance orders has an architecture comprising at least N pieces of equipment, each of which is able to generate guidance orders, N being an integer higher than or equal to 3; and
  said device further comprises passivation means being formed so as to, automatically and repeatedly, make comparisons between the guidance orders, considered as main ones, being generated by at least two pieces of equipment, and a guidance order generated by at least one third piece of equipment, being considered as auxiliary and being only used for comparisons, and to select, as a function of results of these comparisons, one of said main guidance orders, being transmitted to said flight control system of the aircraft, as a passivated guidance order.

The architecture according to the invention for detecting and isolating defective systems relies thus on a principle of a triplex architecture (or with N pieces of equipment (N≥3)) and provides using three sources, or more, at least at the level of the calculation stage of guidance orders for slaving the aircraft on the trajectory, which allows to detect and automatically isolate breakdowns at the level of this stage. Moreover, this stage could consist in identical equipment (symmetric stage) or different equipment (dissymmetric stage).

Thus, the device according to the invention is able to remove a source (or a piece of equipment for generating guidance orders) when the source is defective (and transmits an erroneous or inaccurate order) so as to counteract its possible effects on the trajectory of the aircraft. Moreover, said device is reactive enough for counteracting the effect of an erroneous order on the guidance of the aircraft in a transparent and immediate way.

In a first embodiment of the device according to the invention, said passivation means comprise a first set being provided with a voter and being formed so as:
  to compare each one of said main guidance orders with the auxiliary guidance order; and
  to select, as a passivated guidance order, the main guidance order being the closest to the auxiliary guidance order.

In addition, in a second embodiment, said passivation means comprise a second set being provided with passivation elements and being formed so as:
  to compare with the auxiliary guidance order, each one of said main guidance orders, one of which is selected as a privileged guidance order; and
  to select, as a passivated guidance order, the privileged guidance order as long as it remains the closest to the auxiliary guidance order, within one tolerance value, and otherwise, a passivation value depending on the other main, not privileged, guidance order.

In addition to the above mentioned advantages, this second embodiment selecting in priority (and as long as it remains the closest to the auxiliary guidance order) the privileged guidance order, thus uses for the guidance a source (that is the equipment generating said privileged guidance order) being stable, that means that the selected source does not permanently varies.

This is, more specifically, advantageous in the following cases:
  for RNP operations, some systems being part of a RNP architecture could need to know the source (or the equipment generating the guidance order) being used for the guidance, for adapting their operation to this source, for instance either the flight management system dedicated to the pilot side, or the flight management system dedicated to the copilot side; and
  the guidance orders coming from each flight management system could differ one from the other, as a result of the independence and the asynchronism the associated equipment have. As a result, switching from one source to another could introduce unwanted effects in the guidance loops. Thus, it is preferable that the source being used is stable.

The present invention further relates to:
a guidance system comprising a device such as mentioned hereinabove; and/or an aircraft, in particular a transport airplane, being provided with such a guidance system or such a device.

BRIEF DESCRIPTION OF THE DRAWINGS

The FIGS. of the appended drawings will better explain how this invention can be implemented. In these FIGS., like reference numerals relate to like components.

DETAILED DESCRIPTION

Figure 1:
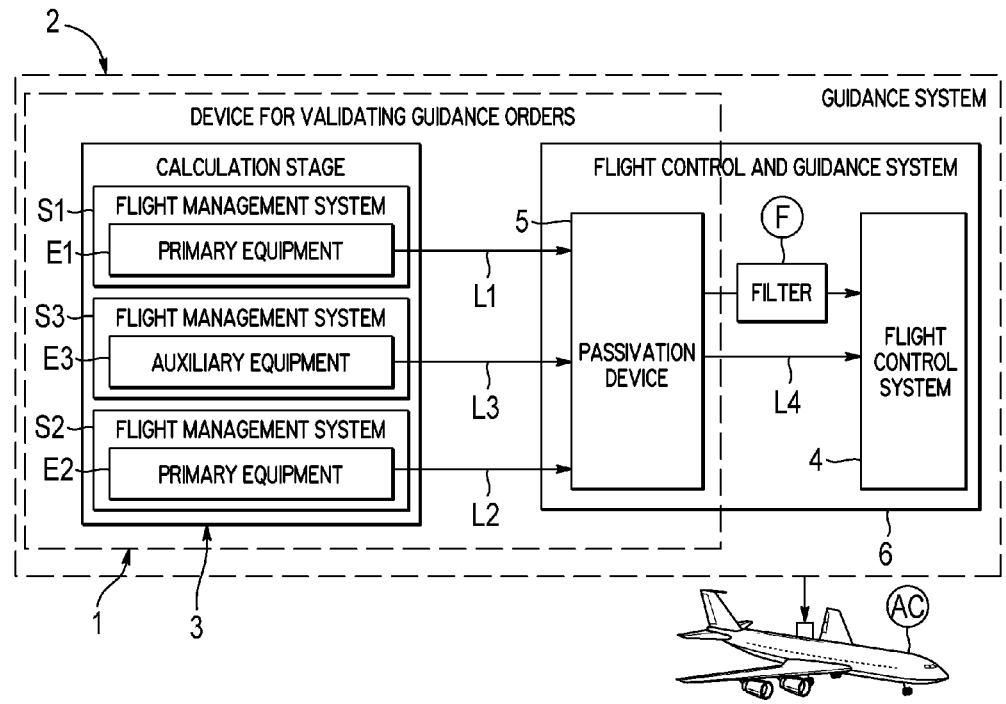
FIG. 1 is a block diagram of a device according to the invention.

The device for validating guidance orders 1 according to this invention and schematically shown on FIG. 1 is a device for the automatic passivation of guidance orders in an aircraft AC), in particular a transport airplane. The term passivation is defined as searching for an erroneous order (or value) amongst a plurality of orders, isolating any found erroneous order, and transmitting a valid order to user systems.

This device 1 is on-board the aircraft, and comprises at least one calculation stage 3 for guidance orders, being intended to communicate with a usual flight control system 4 of the aircraft, as schematically shown on FIG. 1. This device 1 could, in particular, be used so as to aid the air operations to be implemented, requiring a navigation and guidance performance guarantee, and including RNP AR operations.

This device 1 is part of a guidance system 2 of the aircraft. It is known that, generally, a guidance system 2 comprises, in addition to said calculation stage 3 for guidance orders in the aircraft, at least the following successive stages (not shown):
one calculation stage for the position of the aircraft;
one management stage for the flight plan of the aircraft;
one calculation stage for the trajectory of the aircraft; and
one calculation stage for deviations.

In a particular embodiment, not shown, on such a guidance system 2:
said calculation stage for the position of the aircraft could be implemented in inertial and anemobarometric reference systems, of the Air Data and Inertial Reference System ("ADIRS") type. Usually, such systems of the ADIRS type calculate the position of the aircraft from data issued from signal receiving systems (for instance MMR multimode receivers), including Global Navigation Satellite System ("GNSS") signals;
said stages for managing the flight plan, calculating the trajectory and calculating deviations could be implemented in flight management systems, of the Flight Management System ("FMS") type. Usually, these systems manage the flight plane plan from data issued from a navigation data base (not shown) and from data entered by the pilot, build the reference trajectory, and calculate the deviations between the position of the aircraft and this reference trajectory; and said calculation stage for guidance orders could be implemented (at least in part) in flight management systems of the FMS type and/or in flight control and guidance systems of the Flight Control and Guidance system ("FCGS") type. Usually, the latter systems ensure the guidance of the aircraft.

According to the invention, and as shown on FIG. 1:
said calculation stage 3 for guidance orders has an architecture comprising at least N pieces of equipment E1, E2, E3, each of which is able to generate guidance orders, N being an integer higher than or equal to 3. The introduction of such a redundancy allows several comparable guidance orders to be produced; and
said device 1 further comprises a passivation device 5 comprising integrated elements (not shown specifically on FIG. 1) being formed so as to, automatically and repeatedly:
make comparisons between the guidance orders generated by at least two pieces of equipment (E1 and E2 for instance), being considered as main ones or primary equipment, and a guidance order generated by at least one third piece of equipment (E3 for instance), being considered as auxiliary equipment and being only used for comparisons. Said guidance orders are received from said equipment E1 to E3 respectively via links L1 to L3;
select, as a function of results of these comparisons, one of said main guidance orders, as a passivated guidance order; and
transmit the thus selected passivated guidance order to said flight control system 4, via a link L4.

The architecture according to the invention for detecting and isolating defective equipment systems relies thus on a principle of a triplex architecture (or with N pieces of equipment (N≥3)) and provides using three sources (equipment E1 to E3), or more, at least at the level of the calculation stage 3 of guidance orders for slaving the aircraft on the trajectory, allowing to detect and automatically isolate breakdowns at the level of this stage 3. Moreover, this stage 3 could comprise identical equipment (symmetric stage) or different equipment (dissymmetric stage).

In a not shown preferred embodiment, each one of the above mentioned stages of the guidance system 2 has such an architecture comprising at least N pieces of equipment.

Thus, the device 1 according to the invention makes comparisons between the guidance orders issued from at least three different pieces of equipment E1 to E3, so as to generate a passivated guidance order, that is valid (or not erroneous) being transmitted to the flight control system 4 of the aircraft. Thereby, said device 1 is able to remove from the guidance loop a source (or a piece of equipment for generating a guidance order) being defective (and transmits an erroneous or inaccurate order) so as to, more specifically, counteract its possible effects on the trajectory of the aircraft. Moreover, as further detailed herein under, the solution being implemented is reactive enough so as to counteract the effect of an erroneous order on the guidance of the aircraft in a transparent and immediate way.

The present invention thus allows to omit the impact of any simple breakdown in a calculation stage 3 for guidance orders on the trajectory of the aircraft.

Moreover, according to the invention, the passivation device 5 selects, as a passivated guidance order, only one of said two main guidance orders, and not said auxiliary guidance order. Thus, for generating this auxiliary guidance order, one piece of equipment E3 could be provided, having a lower accuracy than the equipment E1 and E2 generating the main guidance orders, allowing to simplify the implementation of the invention and to reduce its cost.

Said passivation device 5 thus aims at comparing the orders issued from each guidance string and at isolating defective values. They then transmit one valid order to slaving loops of the flight control system 4 of the aircraft.

In one particular embodiment shown on FIG. 1:
said equipment E1, E2, E3 are integrated, each one, into a flight management system S1, S2, S3 of the FMS type. The calculation of guidance orders is usually implemented from information associated with the flight plan and from data of the aircraft, by each one of said pieces of equipment E1, E2, and E3; and
said passivation device 5, as well as at least one part of the flight control system 4, is integrated into at least one flight guidance and control system 6 of the FCGS type.

In a particular embodiment, the FMS and FCGS systems meet a usual segregation at the level of the cockpit between the pilot side and the co-pilot side. As an illustration, in this case:
the system S1 could be associated with the pilot side;
the system S2 could be associated with the co-pilot side, said systems S1 and S2 being encompassed under the front FMS's designation and the operations they carry out being directly observable by the crew; and
the system S3 is not allotted to a particular side of the cockpit. This is a third calculation source used for reaching the minimum level of redundancy required from three pieces of equipment.

In a first embodiment (shown on FIG. 2), said passivation device 5 comprises a set 8 being provided with a usual switch 9 and being formed so as:
to compare each one of said main guidance orders (received respectively from equipment E1 and E2) to the auxiliary guidance order (received from the equipment E3); and
to select, as a passivated guidance order, the main guidance order being the closest to the auxiliary guidance order.

The principle of a switch 9 involves transmitting at its outlet the median value between the data (in the present case, the guidance orders) being entered.

Figure 2:
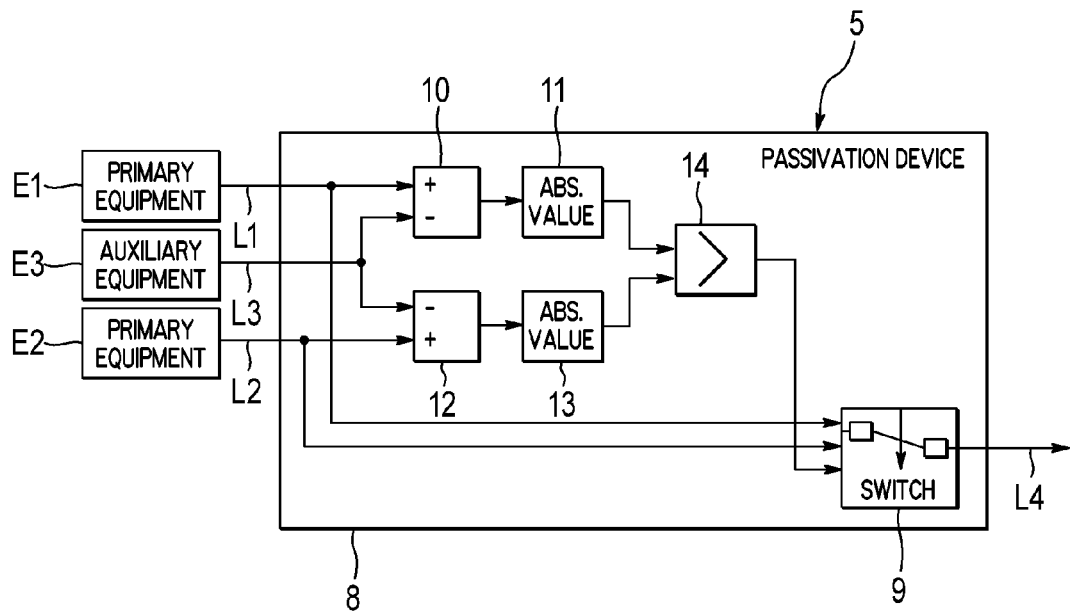
FIG. 2 is a block diagram of a first embodiment of a passivation device according to this invention.

As shown on FIG. 2, said set 8 comprises:
one calculation means 10 for calculating the difference between the main guidance order received from the equipment E1 and the auxiliary guidance order received from the equipment E3;
one calculation means 11 determining the absolute value of the difference calculated by the calculation means 10;
one calculation means 12 calculating the difference between the main guidance order received from the equipment E2 and the auxiliary guidance order received from the equipment E3;
one calculation means 13 determining the absolute value of the difference calculated by the calculation means 12;
one calculation means 14 comparing, therebetween, the results received from the calculation means 11 and 13 and transmitting to the switch 9 the main guidance order for which the absolute value of the corresponding difference is the lowest, the one being the closest to the auxiliary guidance order; and
said switch 9 transmitting, via the link L4, the median value between the main guidance orders (received respectively from the equipment E1 and E2) and the main guidance order received from the calculation means 14.

Figure 3:
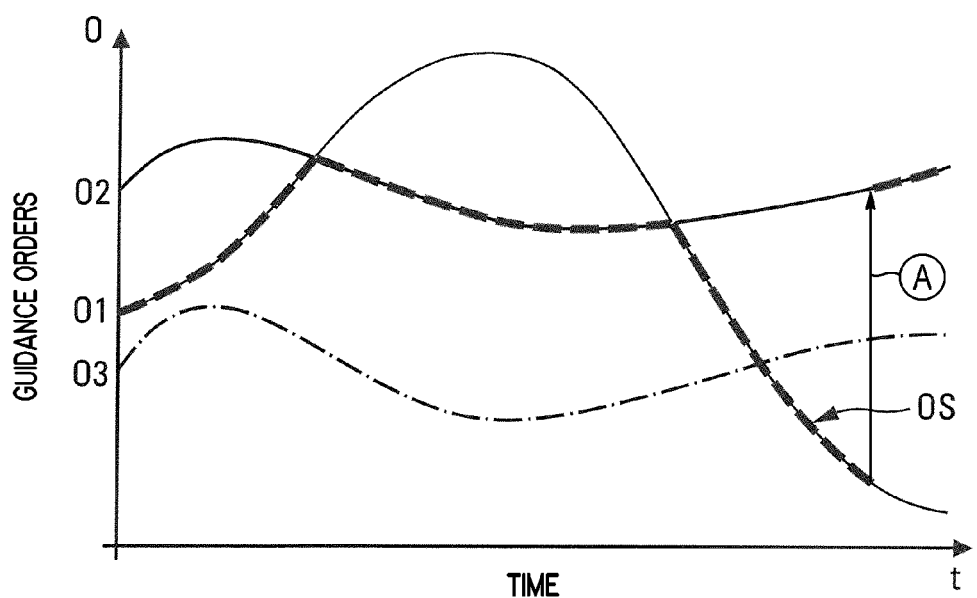
FIG. 3 is a diagram schematically showing input guidance orders and a passivated guidance order plotted over time using the passivation device of FIG. 2.

The chronogram on FIG. 3 allows illustrating the operation of the embodiment of FIG. 2. On this FIG. 3, showing the values 0 of the guidance orders as a function of the time t:
the main guidance order, received from the equipment E1, is shown by a curve O1 in a thin solid line;
the main guidance order, received from the equipment E2, is shown by a curve O2 in a thicker solid line;
the auxiliary guidance order, received from the equipment E3, is shown by a curve O3 in a dash-dot line;
the passivated guidance order, being generated by the set 8 and being transmitted to the flight control system 4, is shown by a curve OS in thick dashed lines. As shown, this passivated guidance order may include a transition A when switching from curve O1 to curve O2.

The set 8 thus selects, as a passivated guidance order, the main guidance order being the closest to the auxiliary guidance order. The latter (received from the equipment E3) is thus never selected as a guidance source. Thus, for generating this auxiliary guidance order, a piece of equipment E3 could be provided, having a lower accuracy than the pieces of equipment E1 and E2 generating the main guidance orders.

This first embodiment also includes the following advantages:
no adjustment is needed; and
a quick reply is obtained for the detection of breakdown cases.

Furthermore, in a second embodiment (shown on FIG. 4), said passivation device 5 comprises a set 16 being provided with switching elements 17, 18, and 19 and being formed so as:
to compare with the auxiliary guidance order (received from the equipment E3), each one of said main guidance orders (received respectively from the equipment E1 and E2), one of which is selected as a privileged guidance order; and
to select, as a passivated guidance order, the privileged guidance order as long as it remains the closest to the auxiliary guidance order, within one tolerance value, and otherwise, a passivation value depending on the other main, not privileged, guidance order.

The principle of a switching element 17, 18, and 19 involves privileging one of its entries (in the present case, the privileged guidance order), and only switching to another source if the associated tolerance is exceeded.

Figure 4:
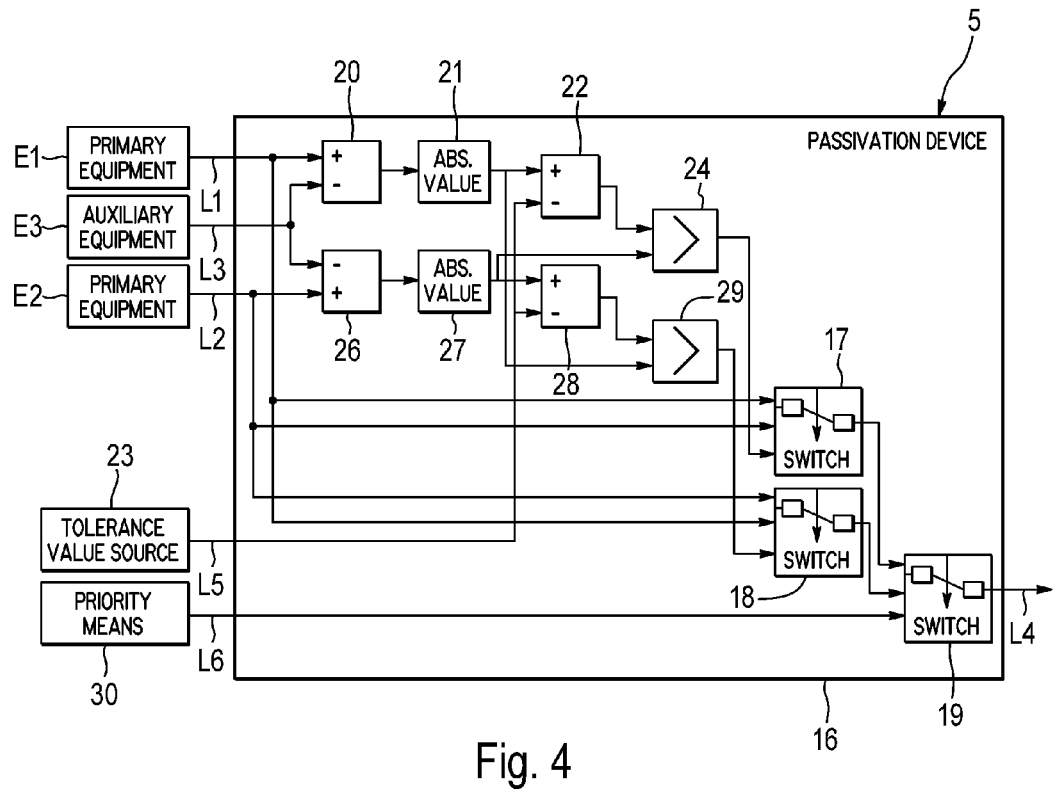
FIG. 4 is a block diagram of a second embodiment of a passivation device according to this invention.

As shown on FIG. 4, said set 16 comprises:
one calculation means 20 for calculating the difference between the main guidance order received from the equipment E1, being for instance considered as the privileged guidance order, and the auxiliary guidance order received from the equipment E3;
another calculation means 26 for calculating the difference between the main guidance order received from the equipment E2, and the auxiliary guidance order received from the equipment E3;
one calculation means 21 for determining the absolute value of the difference calculated by the calculation means 20;
another calculation means 27 for determining the absolute value of the difference calculated by the calculation means 26;
one calculation means 22 for calculating the difference between the absolute value received from the calculation means 21 and a tolerance value TO received from a tolerance value source 23 (via a link L5);
another calculation means 28 for calculating the difference between the absolute value received from the calculation means 27 and a tolerance value TO received from a tolerance value source 23;
one calculation means 24 comparing, therebetween, the results received from the calculation means 22 and 27 and transmitting to the switching element 17 the main guidance order for which the compared result is the lowest;

another calculation means 29 comparing, therebetween, the results received from the calculation means 21 and 28 and transmitting to the switching element 18 the main guidance order for which the compared result is the lowest;

the switching element 17 receiving, at its inlets, the outlets of the equipment E1 and E2 and of the calculation means 24;

the switching element 18 receiving, at its inlets, the outlets of the equipment E1 and E2 and of the calculation means 29;

the switching element 19 receiving, at its inlets, the outlets of the switching elements 17 and 18 and of a priority means 30 for inverting a source (via a link L6), and being connected to its outlet at the link L4.

Figure 5:
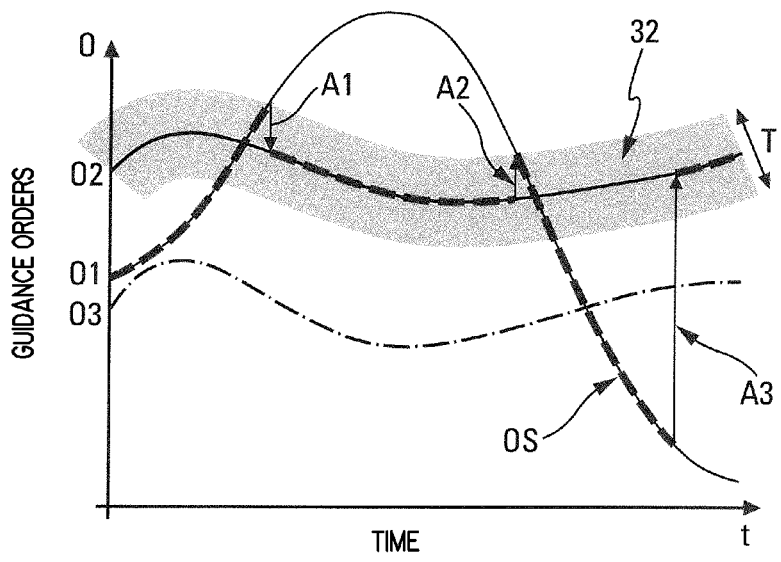
FIG. 5 is a diagram schematically showing input guidance orders and a passivated guidance order plotted over time using the passivation device of FIG. 4.

The chronogram on FIG. 5 allows illustrating the operation of the embodiment of FIG. 4. On this FIG. 5, showing the values 0 of the guidance orders as a function of the time t:

the main guidance order, received from the equipment E1, is shown by a curve O1 in a thin solid line;

the main guidance order, received from the equipment E2, is shown by a curve O2 in a thicker solid line;

the auxiliary guidance order, received from the equipment E3, is shown by a curve O3 in a dash-dot line;

the passivated guidance order, being generated by the set 16 and being transmitted to the flight control system 4, is shown by a curve OS in thick dashed lines.

a tolerance area, on opposite sides of the curve O2, with a width T (T=2.T0), is emphasized by a grey shaded area 32.

The principle of this second solution relies on the operating characteristics of a passivating device with a use of the third source as a comparison means.

The set 16 thus selects, as a passivated guidance order, in priority a privileged guidance order that could be selected through the priority means 30.

In a RNP context, the privileged source is selected amongst the pilot and co-pilot sides in the cockpit. Practically, the priority side is that being used as a reference for guiding the aircraft (a choice made by the crew). The privileged source is thus either the system S1 or the system S2. If the pilot side is selected by the crew for guiding the aircraft, the orders being used are issued from the system S1 as long as the latter does not deviate significantly from the guidance orders produced by the systems S2 and S3. If the system S1 goes out of the tolerances, only the system S2 is used for carrying on the guidance.

This second embodiment thus uses for the guidance a source (that is the equipment generating said privileged guidance order) that is stable, which means that the selected source does not permanently vary. This is, more specifically, advantageous in the following cases:

for RNP operations, some systems being part of a RNP architecture could need to know the source (or equipment generating the guidance order) being used for the guidance, for adapting their operation to this source; and the guidance orders coming from each flight management system could differ from each other, as a result of the independence and the asynchronism the associated equipment have. As a result, switching from one source to another could introduce unwanted effects in the guidance loops. Thus, it is preferable that the source being used is stable.

This second embodiment thus allows a stable guide on the front FMS's with a satisfactory level of reactivity.

This second embodiment has its outlet values skipping during transition phases, as illustrated by the arrows A1, A2, and A3 on FIG. 5. For at least partially overcoming this drawback, the device 1 could comprise, in a particular embodiment, at least one filter (F (FIG. 1)) for filtering the passivated guidance order, so as to obtain a continuous value, being transmitted to said flight control system 4 of the aircraft.

Figure 6:
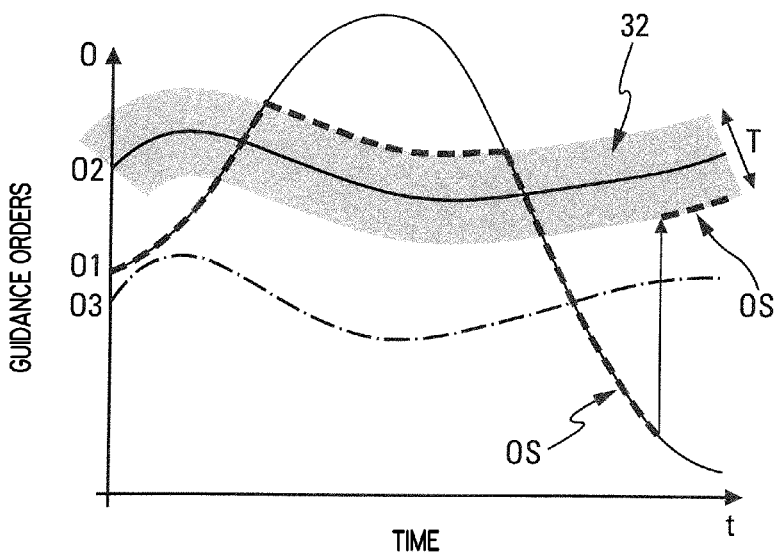
FIG. 6 is a diagram schematically showing input guidance orders and an alternative passivated guidance order plotted over time using the passivation device of FIG. 5.

Upon the transition on the secondary source of data, the outlet value of the passivation device 5 is the exact value of this secondary source of data. It is possible to provide an alternative of this solution, whereby upon switching on the secondary source of data, the outlet is weighted by the limits of the threshold 32, as shown on FIG. 6.

The principles of the sets 8 and 16 have been described based on a formal symbolic representation it is possible to find in languages such as SCADE (Esterel Technologies) or Simulink (the MathWorks Inc.). Various other representations could have been used for describing such principles ranging from a schematic or textual algorithmic description to the use of programming languages such as C, ADA, . . . .

The present invention has thus for an object generating an outlet signal implementing:

the intrinsic characteristics of a voter or of a passivation element; and at least three different information sources, one of which is only used as a comparison means.

It should be noticed that, alternately, the triplex architecture being described in the above mentioned particular embodiments, could be replaced by a higher number of redundancies for each one of the contributors of the function.

The invention claimed is:

1. A passivation method for validating guidance orders by passivation in an aircraft having at least one calculation stage communicating with a flight control system the method comprising:

providing the calculation stage with an architecture comprising at least N pieces of equipment, each of which is able to generate guidance orders, N being an integer higher than or equal to 3, wherein at least two of the pieces of equipment are primary equipment generating first type guidance orders that are selectively used by the flight control system, and at least one other of the pieces of equipment is auxiliary equipment generating second type guidance orders used only to compare and validate the first type guidance orders from the primary equipment; and comparing, automatically and repeatedly by a passivation device, the first type guidance orders being generated by and the second type guidance order being generated by the auxiliary equipment; and selecting, by the passivation device, as a function of results of the comparisons, one of the first type guidance orders, and transmitting the selected first type guidance order to the flight control system as a passivated guidance order that is validated for use by the flight control system.

2. The method according to claim 1, further comprising:

determining, automatically and repeatedly by the passivation device, which of the first type guidance orders is closest to the auxiliary guidance order;

wherein the first type guidance order that is closest to the auxiliary guidance order is selected as the passivated guidance order.

3. The method according to claim 1, further comprising:
    selecting, by the passivation device, a privileged guidance order from one of the first type guidance orders, wherein another of the first type guidance orders is therefore a non-privileged guidance order; and
    determining, automatically and repeatedly by the passivation device, whether the privileged guidance order plus a predetermined tolerance value is closer to the auxiliary guidance order than the non-privileged guidance order,
    wherein the privileged guidance order is selected as the passivated guidance order whenever the privileged guidance order plus a predetermined tolerance value remains the closest to the auxiliary guidance order, and otherwise, a passivation value depending on the non-privileged guidance order is selected as the passivated guidance order.

4. The method according to claim 3, wherein the passivation value is equal to the non-privileged guidance order.

5. The method according to claim 3, wherein the passivation value is equal to a threshold value relative to the non-privileged guidance order.

6. The method according to claim 2, further comprising:
    filtering, by a filter, the passivated guidance order, so as to obtain a continuous value transmitted to the flight control system of the aircraft.

7. A device for validating guidance orders by passivation in an aircraft, the device comprising:
    at least one calculation stage communicating with a flight control system of the aircraft, the at least one calculation stage including an architecture comprising at least N pieces of equipment, each of which is able to generate guidance orders, N being an integer higher than or equal to 3, wherein at least two of the pieces of equipment are primary equipment generating first type guidance orders that are selectively used by the flight control system, and at least one other of the pieces of equipment is auxiliary equipment generating second type guidance orders used only to compare and validate the first type guidance orders from the primary equipment; and
    a passivation device connected to the calculation stage and the flight control system, the passivation device, automatically and repeatedly, making comparisons between the first type guidance orders being generated by the primary equipment and the second type guidance order generated by the auxiliary equipment; selecting as a function of results of the comparisons one of the first type guidance orders; and transmitting the selected first type guidance order to the flight control system, as a passivated guidance order, that is validated for use by the flight control system.

8. The device according to claim 7, wherein said passivation device comprises a first set having a voter and the passivation device also determines, automatically and repeatedly, which of the first type guidance orders is closest to the auxiliary guidance order, wherein the first type guidance order that is closest to the auxiliary guidance order is selected as the passivated guidance order.

9. The device according to claim 7, wherein said passivation device comprises a set having at least one passivation element and the passivation device also selects a privileged guidance order from one of the first type guidance orders, wherein another of the first type guidance orders is therefore a non-privileged guidance order; and determines, automatically and repeatedly by the passivation device, whether the privileged guidance order plus a predetermined tolerance value is closer to the auxiliary guidance order than the non-privileged guidance order,
    wherein the privileged guidance order is selected as the passivated guidance order whenever the privileged guidance order plus a predetermined tolerance value remains the closest to the auxiliary guidance order, and otherwise, a passivation value depending on the non-privileged guidance order is selected as the passivated guidance order.

10. The device according to claim 8, further comprising:
    at least one filter for filtering the passivated guidance order, so as to obtain a continuous value transmitted to the flight control system.

11. An aircraft system for validating guidance orders by passivation, comprising:
    a flight control system incorporated in a flight guidance and control system;
    at least one calculation stage communicating with the flight control system, the at least one calculation stage including an architecture comprising at least N pieces of equipment, each of which is able to generate guidance orders, N being an integer higher than or equal to 3, wherein at least two of the pieces of equipment are primary equipment generating first type guidance orders that are selectively used by the flight control system, and at least one other of the pieces of equipment is auxiliary equipment generating second type guidance orders used only to compare and validate the first type guidance orders from the primary equipment; and
    a passivation device incorporated in the flight guidance and control system, the passivation device including a passivation device connected to the calculation stage and the flight control system, the passivation device, automatically and repeatedly, making comparisons between the first type guidance orders being generated by the primary equipment and the second type guidance order generated by the auxiliary equipment; selecting as a function of results of the comparisons one of the first type guidance orders; and transmitting the selected first type guidance order to the flight control system, as a passivated guidance order, that is validated for use by the flight control system.

12. The device according to claim 9, wherein the passivation value is equal to the non-privileged guidance order.

\* \* \* \* \*